United States Patent [19]

Takamizawa et al.

[11] Patent Number: 5,417,219

[45] Date of Patent: May 23, 1995

[54] ULTRASONIC DIAGNOSTIC APPARATUS

[75] Inventors: Kinya Takamizawa, Utsunomiya; Satoshi Yamazaki; Hiroshi Sasaki, both of Ootawara, all of Japan

[73] Assignee: Kabushiki Kaisha Toshiba, Kawasaki, Japan

[21] Appl. No.: 181,235

[22] Filed: Jan. 13, 1994

[30] Foreign Application Priority Data

Jan. 18, 1993 [JP] Japan .................................. 5-005949

[51] Int. Cl.6 .............................................. A61B 8/00
[52] U.S. Cl. .............................................. 128/663.01
[58] Field of Search ..................... 128/660.05, 661.01, 128/661.07, 661.09, 661.10, 662.03, 663.01

[56] References Cited

U.S. PATENT DOCUMENTS

| | | | |
|---|---|---|---|
| 4,867,169 | 9/1989 | Machida et al. | 128/662.03 |
| 4,972,838 | 11/1990 | Yamazaki | 128/660.05 |
| 5,127,410 | 7/1992 | King et al. | 128/662.03 |
| 5,174,294 | 12/1992 | Saito et al. | 128/660.05 |
| 5,305,756 | 4/1994 | Entrekin et al. | |

OTHER PUBLICATIONS

"Real-time 3-D ultrasound imaging with a 1-D fan beam transducer array", Rob Entrekin, et al., SPIE vol. 1733:264-272 1992).

Primary Examiner—George Manuel
Attorney, Agent, or Firm—Finnegan, Henderson, Farabow, Garrett & Dunner

[57] ABSTRACT

In an ultrasonic imaging apparatus, ultrasound beams are diffused in the slice direction perpendicular to the scanning direction to thereby scan a three-dimensional region of a subject under examination with wide ultrasound beams. Thus, echoes are detected accumulated in the slice direction. Echoes from the surface of a region of interest, such as a fetus, are stronger than echoes from within the region of interest. As a consequence, an ultrasonic image is produced which approximates a surface image. The amount of data required to produce an ultrasonic image, the ultrasonic beam scanning procedure, and the signal processing system are the same as before, which permits real-time operation. A conventional ultrasonic imaging apparatus can be used without modification except a probe adapter for diffusing ultrasound beams in the slice direction.

32 Claims, 8 Drawing Sheets

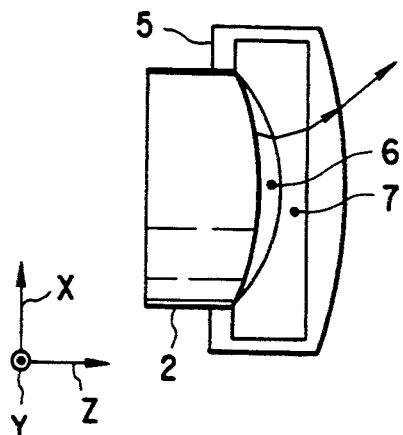
F I G. 2A
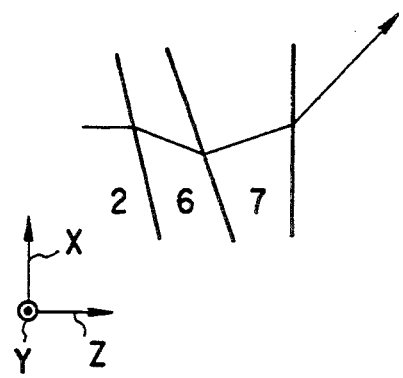
F I G. 2B
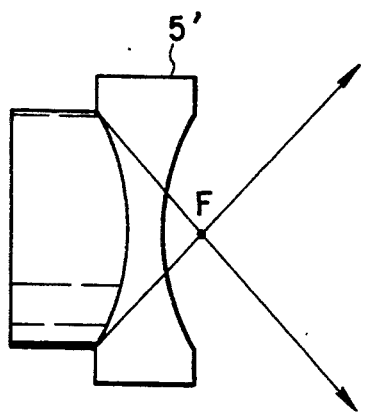
F I G. 2C
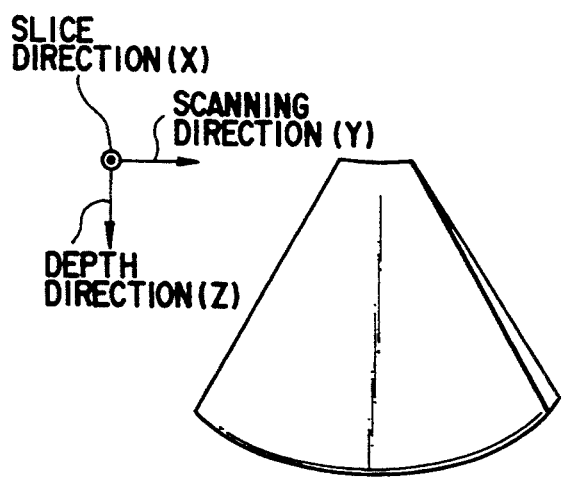
F I G. 3A
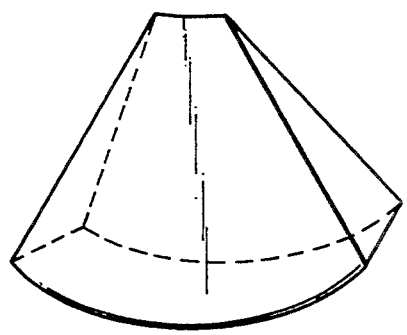
F I G. 3B

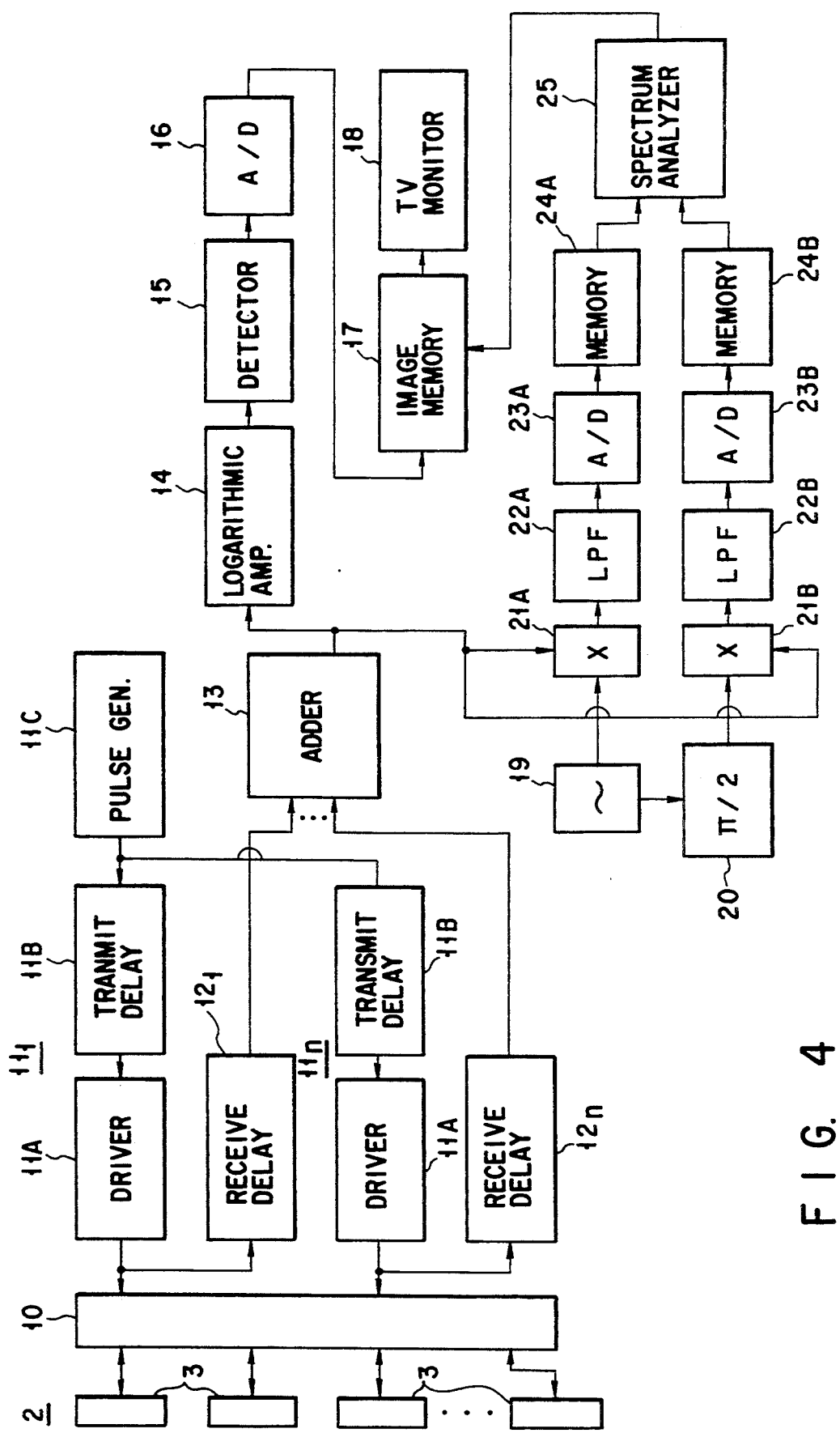
F I G. 4

ULTRASONIC DIAGNOSTIC APPARATUS

BACKGROUND OF THE INVENTION

1. Field of the Invention

The present invention relates to an ultrasonic diagnostic apparatus which is adapted to image a three-dimensional region of a subject under examination.

2. Description of the Related Art

In the prior art of that type of ultrasonic diagnostic apparatus, three-dimensional information on living biological tissues is obtained by electronically or mechanically scanning a three-dimensional region of a subject under examination using focused ultrasonic beams, and that information is then subjected to three-dimensional processing, thereby producing and displaying a three-dimensional image such as a surface image.

However, with such a conventional apparatus, it takes long time to scan a three-dimensional region, and the amount of data to be handled is several tens to several hundreds of times larger than the amount of data required for a single tomography image (two dimensional image). This will result in loss of real-time processing capabilities. Keeping the real-time processing capabilities would require a large-scale signal processor.

SUMMARY OF THE INVENTION

It is therefore an object of the present invention to provide an ultrasonic diagnostic apparatus which permits a three-dimensional region of a subject under examination to be imaged in real time without using a large-scale signal processor.

According to the present invention there is provided an ultrasonic diagnostic apparatus comprising: an ultrasonic probe comprising piezoelectric transducers for electro-acoustic conversion; transmit excitation means for exciting the piezoelectric transducers to transmit ultrasonic waves; receiving means for receiving reflected waves from reflectors within a subject under examination through the piezoelectric transducers; control means for controlling the transmitting/receiving direction or the position of ultrasonic waves transmitted/received by the piezoelectric transducers; detecting means for detecting an image signal from a received signal by the receiving means; displaying means for displaying an image using the image signal output from the detecting means; and a probe adapter or acoustic lens for, when mounted on the ultrasonic probe, diffusing ultrasonic waves transmitted from the piezoelectric transducers in the slice direction perpendicular to the scanning direction.

In the present invention, ultrasound beams are diffused in the slice direction perpendicular to the scanning direction to thereby scan a three-dimensional region of a subject under examination with wide ultrasound beams. Thus, echoes are detected accumulated in the slice direction. Echoes from the surface of an object in a region of interest, such as a fetus, are stronger than echoes from within the object. As a consequence, an ultrasonic image is produced which approximates a surface image. The amount of data required to produce an ultrasonic image, the ultrasonic beam scanning procedure, and the signal processing system are the same as before, thus permitting real-time operation. A conventional ultrasonic imaging apparatus can be used without modification except a probe adapter or acoustic lens for diffusing ultrasound beams in the slice direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A, 2B and 2C are sectional views of the acoustic lens of FIG. 1;

FIGS. 3A and 3B show a two-dimensional scan region and a three-dimensional scan region, respectively;

FIG. 4 is a block diagram of ultrasonic diagnostic apparatus;

DETAILED DESCRIPTION OF THE PREFERRED EMBODIMENTS

Hereinafter, the preferred embodiments of the present invention will be described with reference to the accompanying drawings.

(First embodiment)

Figure 1:
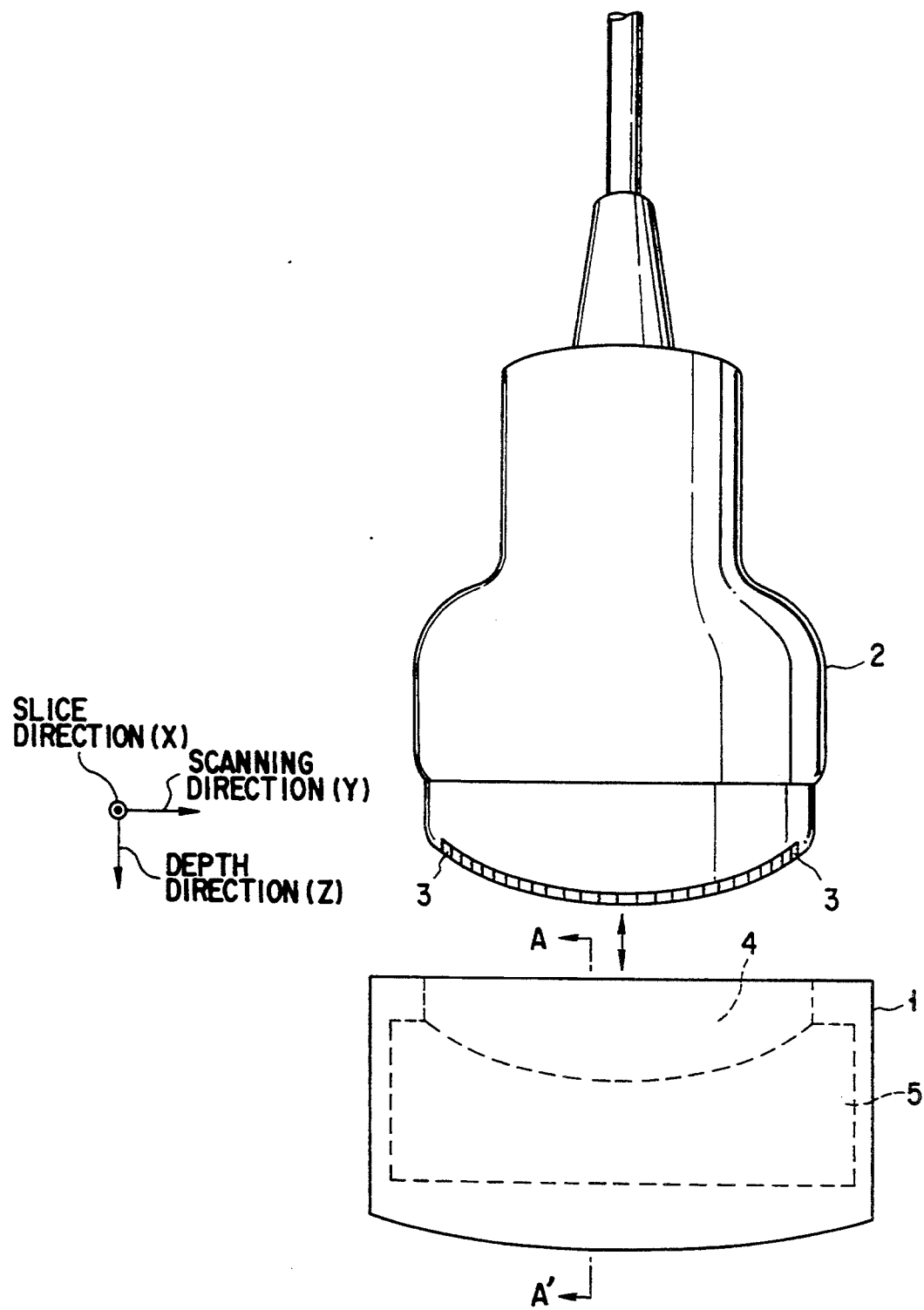
FIG. 1 is an exterior view of an ultrasonic probe and a probe adapter according to a first embodiment of the present invention.

FIG. 1 is an exterior view of a convex type of ultrasonic probe 2 and a probe adapter 1. The ultrasonic probe 2 may be of any one of types such as a sector type, a linear type, etc. The ultrasonic probe 2 is a conventionally used one. In the ultrasonic probe 2, a large number of piezoelectric transducers 3 are arrayed one-dimensionally along the scanning direction, or the Y-axis direction (which is also referred to as azimuth direction). An acoustic lens is attached to the front (ultrasound transmitting/receiving plane) of the array of piezoelectric transducers 3, which focuses ultrasonic waves generated by the transducers or received from the subject.

The probe adapter 1 is formed with a socket 4. The probe adapter is removable from the piezoelectric transducer side of the probe 2 in the socket 4. The acoustic lens 5 is accommodated in the probe adapter 1, which serves as diffusing means for diffusing an ultrasound beam transmitted from the ultrasonic probe 2 or received from the subject in the slice direction or the X-axis direction perpendicular to the scanning direction or the Y-axis direction to thereby increase the width of the ultrasound beam.

FIG. 2A is a sectional view taken along line A-A' of FIG. 1 with the probe adapter 1 attached to the ultrasonic probe 2. The acoustic lens 5, serving as the diffusing lens, consists of layers of one or more materials having different acoustic transmission characteristics (different velocities of sounds within the materials) which are laminated along the direction of travel of ultrasonic waves, i.e., along the direction of depth (Z-axis direction). To diffuse an ultrasound beam transmitted from the ultrasonic probe 2, the materials of the layers are selected such that, assuming the sound velocities in the respective layers to be $V1$ (in the layer on the ultrasonic probe side) and $V2$, and the sound velocity in living organisms to be $V0$, $V1 > V0 > V2$ is met. For example, the acoustic lens 5 may consist of two layers of plastic 6 and silicone rubber 7. A material of the sound velocity $V1$ may be fixed the ultrasonic probe 2.

As indicated by an arrow in FIG. 2B, an ultrasound beam transmitted from the ultrasonic probe 2 is diffused in the direction of slice (X-axis direction) by the acoustic lens 5. The acoustic lens 5 can be replaced by such a focusing lens 5' as shown in FIG. 2C. The focusing lens causes an ultrasound beam from the ultrasonic probe 2 to focus onto a focal point F at a distance from the probe and then diffuse in portions deeper than the focal point F.

The probe adapter 1 is attached to the ultrasonic probe 2 at the time of three-dimensional imaging of a subject. For two-dimensional imaging, the probe adapter 1 does not have to be attached to the ultrasonic probe 2.

FIG. 3A shows a two-dimensional scan region when the probe adapter 1 is not attached to the ultrasonic probe 2, while FIG. 3B shows a three-dimensional scan region when the adapter is attached to the probe. The ultrasound beam having an increased beam width as a result of diffusion in the slice direction by the probe adapter 1 is sequentially shifted in the direction of channel under electronic control of a transmitting/receiving control system, whereby a three-dimensional region is scanned. As a consequence, echoes generated within the three-dimensional region of FIG. 3B are received by the ultrasonic probe 2. Echoes generated in portions at equal depth from the ultrasonic probe 2 are received simultaneously by the ultrasonic probe 2. Consequently, a received signal is equivalent to an integral of echoes generated at equal depth in the slice direction. For example, suppose that a fetus held in amniotic fluid is scanned. Then a B-mode image (tissue image) produced from such a received signal will approximate a surface image of the fetus because the intensity of echoes from the boundary surface between the amniotic fluid and the fetus (i.e., the surface of the fetus) is higher than the intensity of echoes from the inside of the fetus.

FIG. 4 is a block diagram of an ultrasonic diagnostic apparatus to which the ultrasonic probe 2 is attached. The apparatus, which is arranged identically to a conventional one, will be described briefly. Ultrasonic probe 2 is equipped with a one-dimensional array of a large number of piezoelectric transducers 3 along the scanning direction. Let the number of piezoelectric transducers (the number of channels) that are excited simultaneously (more accurately, they are subjected to delayed excitation) so as to produce a single beam of ultrasound be n. A set of the n adjoining transducers 3 that are driven simultaneously is connected to transmit control systems $11_1$ to $11_n$ by an electronic switch circuit 10. At each transmission/reception of ultrasound, a set of the n adjoining transducers excited simultaneously to produce an ultrasound beam is shifted in position by one transducer. Thereby, the shifting of ultrasound beams, i.e., scanning, is effected. The transmission control systems $11_1$ to $11_n$ comprise a pulse generator 11C for generating a rate pulse determining the repetition period of ultrasound pulses, transmit delay circuits 11B each providing a delay time inherent in the corresponding one of the simultaneously excited transducers to that rate pulse, and exciting circuits 11A each applying an exciting pulse to the corresponding transducer of the simultaneously excited transducer set via the electronic switch circuit 10 at the time of receipt of a rate pulse from the corresponding transmit delay circuit 11B to thereby cause that transducer to produce an ultrasonic wave.

Reflected waves from the boundary between acoustic impedances (e.g., the surface of the fetus) within the subject are received by the same transducers as at the transmission time. Received signals by the n transducers are furnished with respective inherent time delays in the receive delay circuits $12_1$ to $12_n$ and then added together in an adder 13. An output signal of the adder 13 is fed via a logarithmic amplifier 14 into a detector circuit 15 where the distribution of intensity in the direction of depth, i.e., an envelope is detected as an image signal. This image signal is converted to digital form by an analog-to-digital converter (A/D) 16 and then stored in an image memory 17. Such an operation is repeated until the opposite utmost end of the scan region is captured by a scanning ultrasound beam. Thereby, a large number of image signals required to produce a single image will be stored in the image memory 17. The image signals are then read out of the image memory 17 in sequence and displayed on a TV monitor 18 as a B-mode image (tissue image).

The output signal of the adder 13 is also sent to a Doppler circuit 30, which measures the velocity (average velocity) of a moving object, such as blood flow, on the basis of a frequency shift (a difference between transmitted and received frequencies) caused by the Doppler effect. The adder output signal is multiplied by reference signals (of the transmitted frequency) in quadrature (i.e., 90 degrees out of phase with each other) in mixers 21A and 21B so as to detect a frequency shift. The reference frequency (equal to the transmitted frequency) is applied from an oscillator 19 directly to the mixer 21A. The mixer 21B receives the reference frequency via a 90-degree phase shifter 20. The output signals of the mixers 21A and 21B, after their contained high-frequency components twice as high as the transmitted frequency are removed by lowpass filters 22A and 22B, are applied to a spectrum analyzer 25 via analog-to-digital converters 23A, 23B and memories 24A, 24B in this sequence. The spectrum analyzer 25 analyzes the frequency shift to calculate the center frequency, variance, and power of Doppler signal for each of volumes within a scan region as image signals. The center frequency (average velocity), variance, and power are held in the image memory 17. Such an operation is repeated until the opposite utmost end of the scan region is captured by a scanning ultrasound beam. Thereby, a large number of image signals required to produce a Doppler image will be held in the image memory 17. The image signals are then read out of the image memory 17 in sequence, so that a Doppler image (the two-dimensional distribution of the average velocity, etc.) is displayed in color on the TV monitor 18.

Whether the probe adapter 1 is attached to the ultrasonic probe 2 or not, the apparatus itself thus constructed performs the same operation. When the adapter 1 is attached to the probe 2, ultrasound beams transmitted from the probe and received by the probe are diffused in the slice direction by the adapter, whereby their beam width is increased. This permits the scanning of a three-dimensional region as shown in FIG. 3B.

By making a scan with the adapter 1 attached to the probe 2 using the same procedure as a usual two-dimensional scan, a three-dimensional region is imaged as a surface image. Since the scan procedure, the amount of data and the signal processing required to create an image are the same as those in the usual two-dimensional scan, a conventional ultrasonic diagnostic apparatus can be used as it is except with the probe adapter. Moreover, the real-time processing is allowed.

The probe adapter 1 can be modified as follows.

Figure 5A:
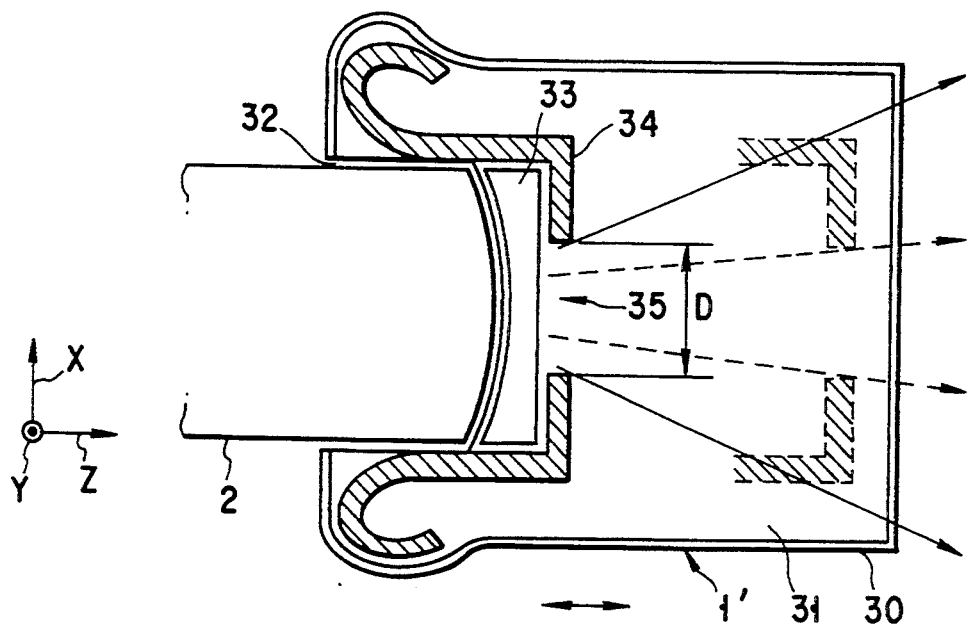
FIGS. 5A and 5B show the structure of a probe adapter for restricting the aperture.

FIG. 5A is a sectional view of a probe and adapter assembly incorporating a first modified form of the probe adapter 1'. This adapter is intended to make the angle of diffusion of an ultrasound beam variable in the slice direction by effectively restricting the aperture of the ultrasonic probe 2 in the slice direction. The smaller the transmission aperture, the larger the angle of diffusion of an ultrasound beam becomes. Within a sealed case 30, which is formed with a socket 32 that permits the case to be removably mounted on the ultrasonic probe 2 and which is made of a synthetic resin and filled with a fluid sound transmitting material 31 such as degassed water, an acoustic lens 33 serving as a diffusing lens is accommodated immediately in front of the probe 2. The sealed case 30 is made of a material having a good sound transmitting property such as polymethyl pentane. As means of restricting the effective aperture of the ultrasonic probe 2 in the slice direction, a sound shielding plate 34, which is formed with a slit 35 having a predetermined width W along the slice direction (X-axis direction) and its lengthwise dimension parallel to the scanning direction (Y-axis direction), is placed in front of the acoustic lens 33 within the sealed case 30 so that it is slidable along the direction of depth (Z-axis direction). The sound shielding plate 34 is molded out of a sound absorbing material such as silicone rubber. When the sound shielding plate 34 is slided, its distance to the acoustic lens 33 varies, whereby the angle of diffusion of ultrasound beams is adjusted accordingly.

Figure 5B:
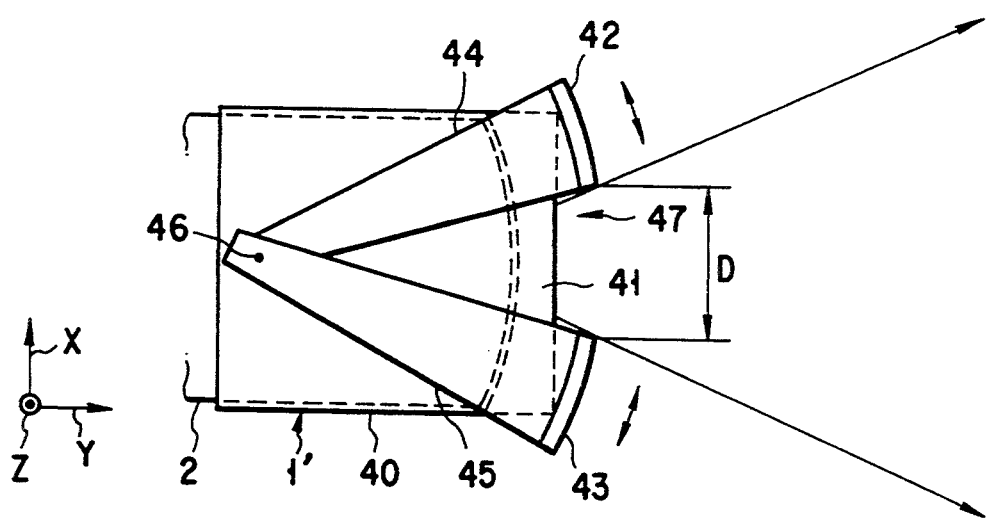

FIG. 5B shows, in a sectional view, a probe and adapter assembly incorporating a second modified form of the probe adapter. This probe adapter 1' is intended to diffuse ultrasound beams in the slice direction by effectively restricting the aperture of the probe in the slice direction. Within an adapter body 40 formed with a socket which permits removable mounting of the adapter on the ultrasonic probe 2, an acoustic lens 41 serving as a diffusing lens is placed in front of the probe 2. As means of restricting the effective aperture of the probe 2 in the slice direction, two sound shielding plates 42 and 43 molded out of a sound absorbing material such as silicone rubber are supported by arms 44 and 45 in front of the acoustic lens 41 with arbitrary spacing D therebetween. Thereby, a slit 47 having a width of D in the slice direction is formed with its lengthwise dimension parallel to the scanning direction. The arms 44 and 45 are pivoted at 46. By opening or closing the two arms 44 and 45, the sound shielding plate spacing D (the width of the slit 47) is adjusted. Thus, the aperture of the ultrasonic probe 2 is varied in the slice direction, whereby the angle of diffusion of ultrasound beams is adjusted accordingly.

Figure 6:
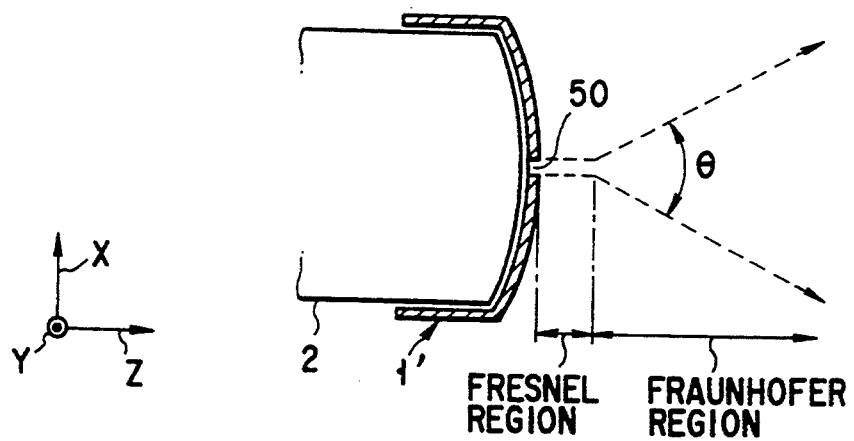
FIG. 6 is a sectional view of another aperture-restricting probe adapter.

FIG. 6 is a sectional view of a probe and adapter assembly incorporating a third modified form of the probe adapter. The probe adapter 1' is molded out of a sound absorbing material such as silicone rubber and has a slit 50 having a minute width D like a pinhole and its lengthwise dimension parallel to the scanning direction. An ultrasound beam emitted from the ultrasonic probe 2 is narrowed down to the small width D by the slit 50. Acoustic waves emerging from the slit 50 travel parallely in the near field (Fresnel region) between the slot and $D^2/4\lambda$ ($\lambda$ is the wavelength of ultrasonic waves) and then diffuse at an angle of diffusion of $\theta = \sin^{-1}(\lambda/d)$ in the far field (Fraunhofer region) beyond the near field. The angle of diffusion depends on the wavelength $\lambda$. This will also offer an advantage of being capable of adjusting the angle $\theta$ of diffusion of ultrasonic waves by changing the frequency of excitation pulses applied to the transducers.

Figure 7A:
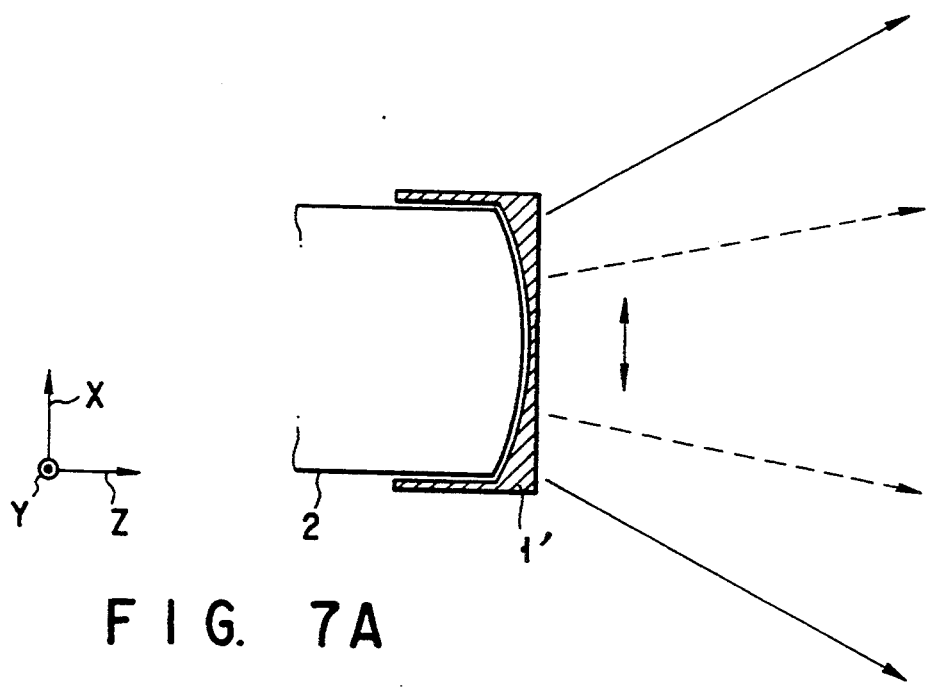
FIG. 7A is a sectional view of still another aperture-restricting probe adapter.
Figure 7B:
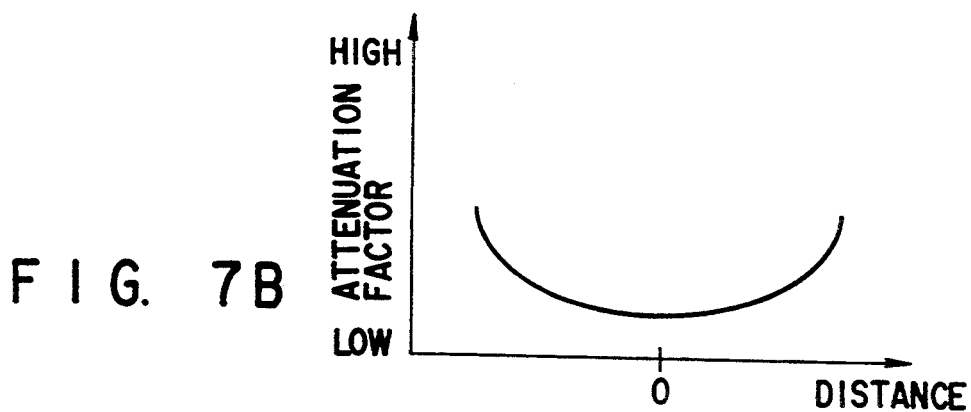
FIG. 7B shows attenuation factor versus distance in the slice direction of the probe adapter of FIG. 7A.
Figure 8:
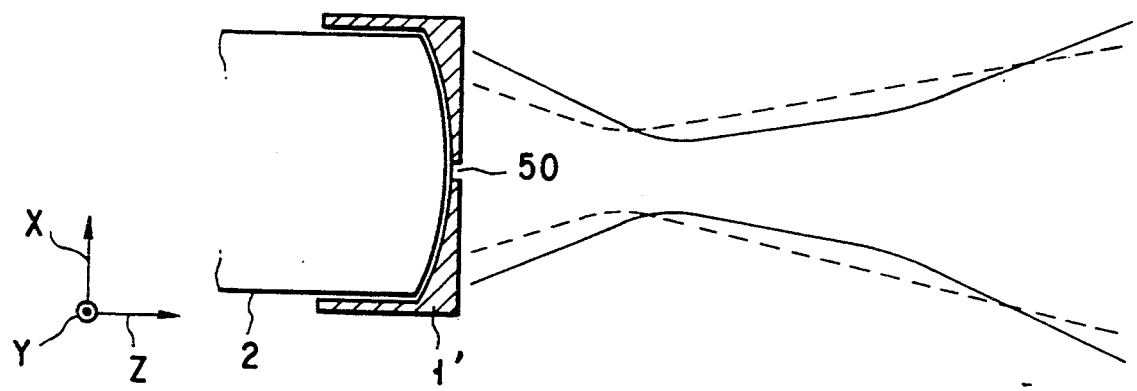
FIG. 8 is a sectional view of a probe adapter which combines the probe adapters of FIGS. 6 and 7A.

FIG. 7A shows, in a sectional view, a probe and adapter assembly incorporating a fourth modified form of the adapter. FIG. 7B shows the relative change of the attenuation factor with respect to distance from the center of the probe adapter 1' in the slice direction. The probe adapter 1' is formed such that the attenuation factor decreases with increasing distance from the center O of the adapter as shown in FIG. 7B. It is known that the attenuation factor of ultrasonic waves increases or decreases in proportion to their frequency. When the frequency of the excitation pulses applied to the piezoelectric transducers is made high, therefore, the amount of attenuation at the end portions of the adapter in which the attenuation factor is relatively high becomes considerably greater than that in the center O of the adapter in which the attenuation factor is low. This effectively narrows the diameter in the slice direction of a diffused beam which is emitted from the ultrasonic probe 2, thus decreasing the angle of diffusion. When the excitation pulses are made low in frequency, on the other hand, there is little difference in the amount of attenuation between the end portions where the attenuation factor is high and the center where the attenuation factor is low. Consequently, the diffused beam diameter in the slice direction is broadened, thereby increasing the angle of diffusion. Note that, as shown in FIG. 8, the probe adapter 1 of FIG. 7A may be provided with such a slit 50 as shown in FIG. 6.

Figure 9:
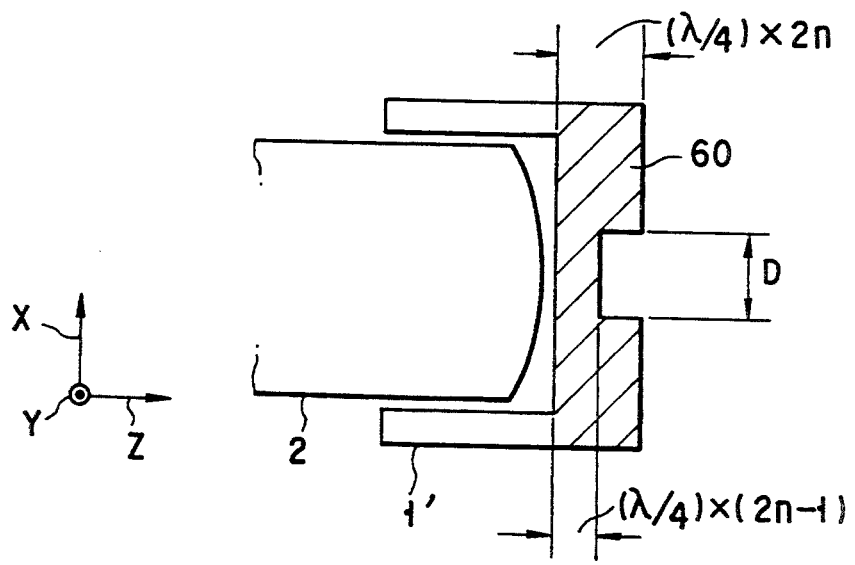
FIG. 9 is sectional view of a further aperture-restricting probe adapter.

FIG. 9 is a sectional view of an adapter and probe assembly incorporating a fifth modified form of the adapter. Oblique lines indicate an acoustic impedance matching layer 60 having an average impedance of the acoustic impedance of the front of the ultrasonic probe 2 and the acoustic impedance of a subject under examination. The acoustic matching layer 60 is placed immediately in front of the probe 2. Suppose that the thickness of the acoustic matching layer is t and n is a positive integer. Then the attenuation factor is at a minimum when $t = (\lambda/4) \times (2n - 1)$, in which case the greater part of an ultrasound beam is allowed to pass through. When $t=(\lambda/4)\times 2n$, on the other hand, the attenuation factor is at a maximum, in which case the greater part of an ultrasound beam will be blocked. Thus, by forming the acoustic impedance matching layer 60 such that its central portion having a width D in the slice direction has a thickness of $(\lambda/4)\times(2n-1)$ and its remaining portion has a thickness of $(\lambda/4)\times 2n$, the aperture of the ultrasonic probe 2 in the slice direction can be effectively restricted to diffuse an ultrasound beam in the slice direction. If the excitation pulse frequency applied to the transducers is adjusted to change the wavelength $\lambda$ of resulting acoustic waves by a factor of $(2n-1)/2n$, the attenuation factor will be reversed. That is to say, the attenuation factor becomes maximum in a portion having a thickness of $(\lambda/4)\times(2n-1)$ and minimum in a portion of a thickness of $(\lambda/4)\times 2n$. This state is substantially equivalent to the state where the probe adapter 1' is not mounted on the ultrasonic probe 2.

among C0, C1 and C2 in such a way as to satisfy the two equations.

$$\frac{\sin\left[\left|\tan^{-1}\left(\frac{df_2}{dx}\bigg|_{x_{13}}\right)\right|\right]}{\sin\left[\left|\tan^{-1}\left(\frac{df_2}{dx}\bigg|_{x_{13}}\right)\right|-\sin^{-1}\left[\frac{c_0}{c_1}\cdot\sin\left(\left|\tan^{-1}\left(\frac{df_1}{dx}\bigg|_{x_{11}}\right)\right|\right)\right]-\tan^{-1}\left(\frac{df_1}{dx}\bigg|_{x_{11}}\right)\right]}=\frac{c_2}{c_0}$$

$$\frac{|f_1(x_{11})-y_{11}|}{c_1}+\frac{[(n-1)^2(x_{11}-x_{01})^2+(f_2(x_{13})-f_1(x_{11}))^2]^{\frac{1}{2}}}{c_0}+\frac{|y_{14}-f_2(x_{13})|}{c_2}=\frac{|y_{11}-y_{14}|}{c_0}$$

Figure 10:
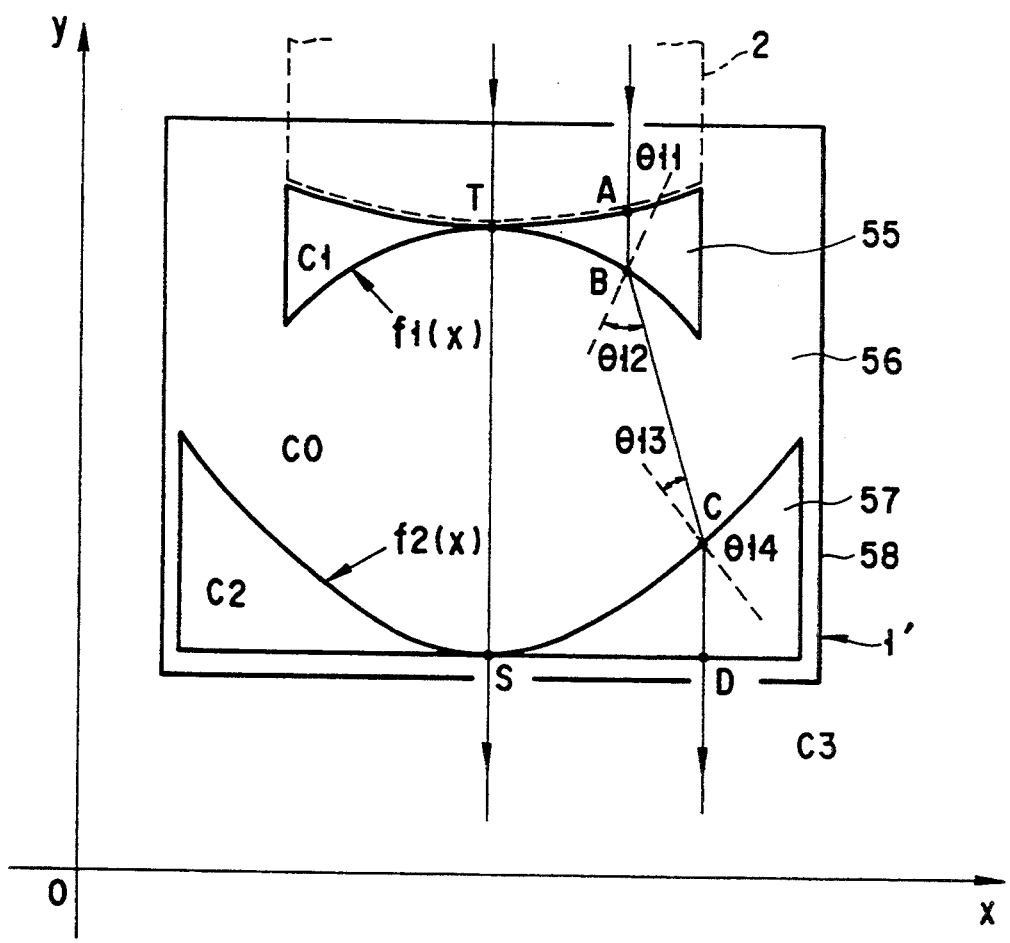
FIG. 10 is a sectional view of a probe adapter which compensates for differences in the receive timing.

FIG. 10 is a sectional view of an adapter and probe assembly incorporating a sixth modified form of the probe adapter. An ultrasound beam is diffused in the slice direction (X-axis direction) by means of two acoustic lenses 55 and 57. Consider two points of equal depth from the surface of a subject under examination with the first point positioned to the central side of an ultrasound beam and the second point positioned to the end side of the beam in the slice direction. The first point is nearer to the probe than the second point. Thus, echoes from the first point will be received somewhat earlier than those from the second point. This will produce an image which looks to be recessed toward the ultrasonic probe. The probe adapter of the sixth modified form meets this problem. A case 58 is filled with an ultrasound transmitting material 56, and the two concave acoustic lenses 55 and 57 are placed to be opposed to each other in the direction in which ultrasonic waves travel. The lenses 55 and 57 diffuse an ultrasound beam in the slice direction (X-axis direction). The property of the ultrasound transmitting material 56 is selected such that the velocity C0 of sound in it is lower than C1 and C2 in the acoustic lenses 55 and 57. The travel length of acoustic waves through the ultrasound transmitting material 56 increases with increasing distance from the center T, S of the acoustic lens 55, 57. Since the sound velocity C0 in the ultrasound transmitting material 56 is lower than the sound velocities C1 and C2 in the acoustic lenses 55 and 57, echoes from points at equal depth from the surface of a subject under examination but with varying distances to the ultrasonic probe 2 are received at substantially the same time.

By adjusting the relative relation among C0, C1 and C2, the angle of diffusion of an ultrasound beam can be adjusted. Let f1, f2 and f3 be the transfer functions of the ultrasound transmitting material 56, the acoustic lens 55 and the acoustic lens 57, respectively. Then the two following equations hold. A desired angle of diffusion can be obtained by adjusting the relative relation Since each of the acoustic lens in the probe adapter is formed of layers of materials with different sound transmitting properties, sound waves will undergo multiple reflection at material boundaries. This will be solved by forming the acoustic lenses of the probe adapter in the following manner. That is to say, the adapter acoustic lenses are formed out of a material having the same sound transmitting property as the acoustic lens of the ultrasonic probe into the shape of a convex form if the sound velocity in the probe acoustic lens is lower than that in living body. Thereby, the focus is positioned at some distance from the surface of the acoustic lens of the probe adapter. An ultrasound beam diffuses in regions deeper than that focus.

The formation of the probe adapter acoustic lens in such a way that the attenuation factor gradually increases from its one end to its other end in the slice direction will produce the following effect. That is, the intensity of echoes received through the one end is greater than that of echoes received through the other end. Thus, an ultrasonic image is highlighted in the foreground in the slice direction, obtaining a sense of depth.

(Second embodiment)

In the first embodiment described above, a probe adapter is mounted on an ultrasonic probe to diffuse ultrasound beams. In contrast, the present embodiment uses a two-dimensional array type of ultrasonic probe in which a plurality of piezoelectric transducers are arrayed along the channel direction (Y direction) and the slice direction (X direction) and introduces a time delay in each of received signals by a plurality of transducers. A description will be made hereinafter on the assumption that four transducers are arrayed along the slice direction and 4×4 transducers are excited simultaneously. The following is an explanation of receiving. Of course, principle of a transmitting is the same with that of receiving.

Figure 11:
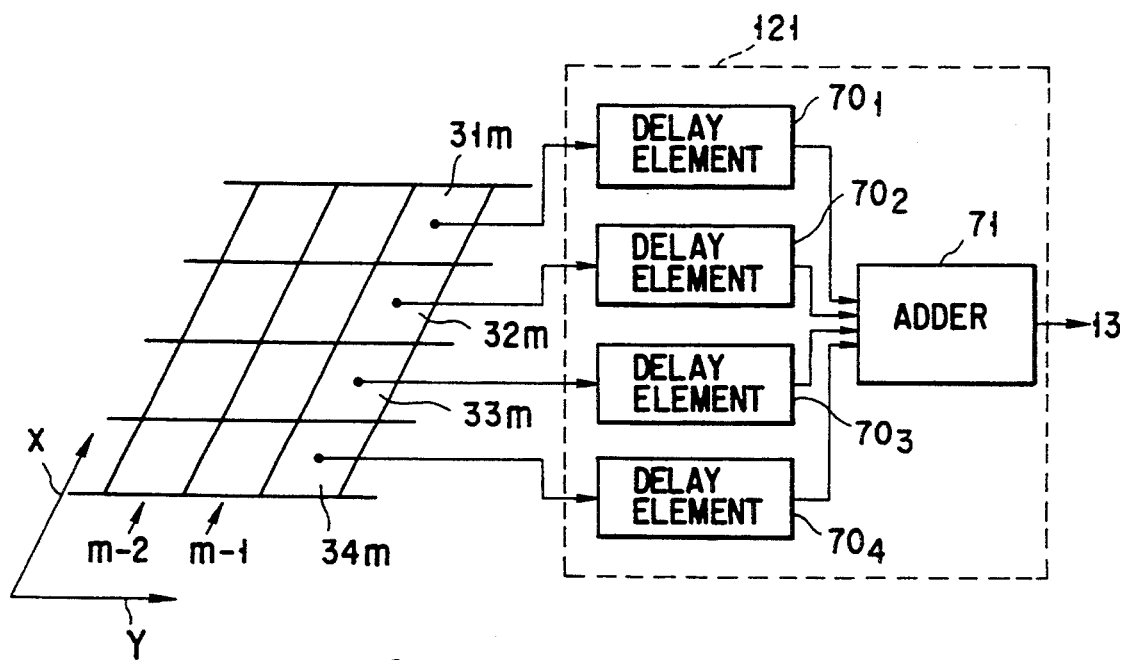
FIG. 11 is a block diagram of a receive delay circuit according to a second embodiment of the present invention.
Figure 12A:
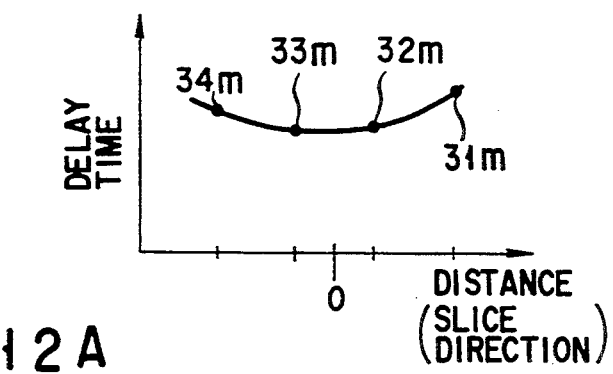
FIGS. 12A and 12B show delay characteristics in the respective channel and slice directions.
Figure 12B:
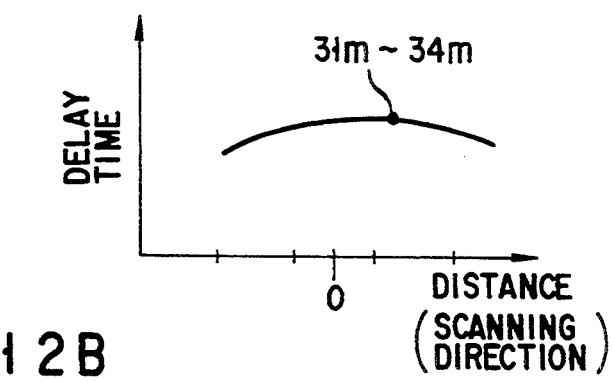

FIG. 11 is a block diagram of the receive delay circuit $12_1$ of FIG. 4 in accordance with the present embodiment. The other receive delay circuits $12_2$ to $12_n$ ($n=4$) are arranged identically to the receive delay circuit $12_1$. The receive delay circuit $12_1$ is equipped with delay elements $70_1$ to $70_4$ equal in number to the transducers (four in this example) of the same channel number arrayed along the slice direction and an adder 71 for adding outputs of the delay elements $70_1$ to $70_4$. The delay elements $70_1$ to $70_4$ are respectively connected to transducers $31m$ to $34m$ on the mth channel via an electronic switch. Each of the delay elements $70_1$ to $70_4$ introduces an inherent delay time in a corresponding one of output signals of the transducers $31m$ to $34m$. A delay time introduced by each of the delay elements $70_1$ to $70_4$ is set to the sum of a delay time (refer to FIG. 12A) corresponding to its distance to the center O of the simultaneously excited transducer group in the slice direction and a delay time (refer to FIG. 12B) corresponding to its distance from the center O of the simultaneously excited transducer group in the scanning direction. For the slice direction, the delay time is set to decrease with increasing distance from the center O, which permits an ultrasound beam to diffuse in the slice direction.

The present embodiment can be modified as follows. The electronic switch is arranged to decrease the number of transducers that are arrayed in the slice direction and are connected to the transmission control system and the receive delay circuits. That is, the electronic switch connects only a small number of transducers, say, one or two, of a number of transducers that are paralleled in the slice direction, to the transmission control system and the receive delay circuits. Thereby, the diameter in the slice direction is physically made small, permitting an ultrasound beam to diffuse in the slice direction.

Amplifiers having different gains can be connected between the delay elements $70_1$ to $70_4$ and the adder 71 to impart a sense of depth to a B-mode image. That is, the amplifier gains are set to progressively decrease (or increase) in the direction from the transducer $31m$ to the transducer $34m$. Thereby, a received signal on one side in the slice direction is made greater in intensity than a received signal on the other side. As a result, a B-mode image is highlighted in the foreground in the slice direction, providing a sense of depth.

Where acoustic waves are diffused through electronic control in such a way, an angle of diffusion of ultrasound beams can be adjusted by changing a correspondence between distance from the center O and delay time and/or changing the number of simultaneously excited transducers.

The present invention is not restricted to the embodiments described above but can be practiced in various modified forms. The ultrasonic probe may be of a type used within a body cavity.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An ultrasonic diagnostic apparatus comprising:
   an ultrasonic probe comprising piezoelectric transducers for electro-acoustic conversion;
   transmit excitation means for exciting said piezoelectric transducers to transmit ultrasonic waves;
   receiving means for receiving reflected waves from reflectors within a subject under examination through said piezoelectric transducers;
   control means for controlling said transmit excitation means and said receiving means to scan a two-dimensional scanning plane;
   detecting means for detecting an image signal from a received signal by said receiving means;
   displaying means for displaying an image using said image signal output from said detecting means; and
   a probe adapter for, when mounted on said ultrasonic probe, diffusing ultrasonic waves transmitted from said piezoelectric transducers and/or received from said reflectors in a slice direction perpendicular to the scanning plane.

2. The apparatus according to claim 1, in which said detecting means detects an envelope of said received signal as said image signal, and said display means displays a tissue image using said image signal output from said detecting means.

3. The apparatus according to claim 1, in which said detecting means detects Doppler components associated with a moving object and contained in said received signal, and said display means displays a Doppler image using said image signal output from said detecting means.

4. The apparatus according to claim 1, in which said probe adapter is equipped with an acoustic lens for diffusing ultrasonic waves in the slice direction.

5. The apparatus according to claim 4, in which said acoustic lens consists of layers of a plurality of materials having different sound transmitting properties which are laminated in the direction in which ultrasonic waves are transmitted.

6. The apparatus according to claim 5, in which said materials include plastic and silicone rubber.

7. The apparatus according to claim 1, in which said probe adapter is provided with a restricting means for restricting the aperture in the slice direction of said ultrasonic probe.

8. The apparatus according to claim 7, in which said restricting means comprises a sound wave shielding member formed with a slit-like aperture in the slice direction.

9. The apparatus according to claim 8, in which said probe adapter is provided with means for holding said sound shielding member so that it can move away from and back toward said ultrasonic probe for the purpose of adjusting an angle of diffusion of ultrasonic waves in the slice direction.

10. The apparatus according to claim 8, in which said probe adapter is provided with means for changing the width of said aperture in the slice direction for the purpose of adjusting an angle of diffusion of ultrasonic waves in the slice direction.

11. The apparatus according to claim 7, in which said restricting member is formed such that its sound transmitting property lowers from its center toward its end along the slice direction.

12. An ultrasonic imaging apparatus comprising:
    an ultrasonic probe comprising a two-dimensional array of piezoelectric transducers;
    transmit excitation means for exciting said piezoelectric transducers to transmit ultrasonic waves;
    receiving means for receiving reflected waves from reflectors within a subject under examination through said piezoelectric transducers;
    control means for controlling said transmit excitation means and said receiving means to scan a two-dimensional scanning plane, and for controlling said transmit excitation means and said receiving means to diffuse the transmitting and/or receiving ultrasound waves in a slice direction perpendicular to the scanning plane;
    detecting means for detecting an image signal from a received signal by said receiving means; and
    displaying means for displaying an image using said image signal output from said detecting means.

13. The apparatus according to claim 12, in which said detecting means detects an envelope of said received signal as said image signal, and said display means displays a tissue image using said image signal output from said detecting means.

14. The apparatus according to claim 12, in which said detecting means detects Doppler components associated with a moving object and contained in said received signal, and said display means displays a Doppler image using said image signal output from said detecting means.

15. The apparatus according to claim 12, in which said transmit excitation means is equipped with delay control means for delaying the excitation timing of transducers placed on one end side more than that of transducers placed on the central side in the slice direction.

16. The apparatus according to claim 12, in which said transmit excitation means is equipped with means for restricting transducers to be excited of said transducers in the slice direction.

17. A probe adapter for use with an ultrasonic probe comprising:
   an adapter body adapted to be removably mounted on said ultrasonic probe that is equipped with a number of piezoelectric transducers to scan a two-dimensional scanning plane; and
   diffusing means accommodated in said adapter body for diffusing ultrasonic waves transmitted from said ultrasonic probe and/or received from the reflectors within a subject in the slice direction perpendicular to the scanning plane.

18. The adapter according to claim 17, in which said diffusing means comprises an acoustic lens for diffusing ultrasonic waves in the slice direction.

19. The adapter according to claim 18, in which said acoustic lens consists of layers of a plurality of materials having different sound transmitting properties which are laminated in the direction in which ultrasonic waves are transmitted.

20. The adapter according to claim 19, in which said materials include plastic and silicone rubber.

21. The adapter according to claim 17, in which said diffusing means comprises a restricting member for restricting the aperture in the slice direction of said ultrasonic probe.

22. The adapter according to claim 21, in which said restricting member comprises a sound wave shielding member formed with a slit-like aperture in the slice direction.

23. The adapter according to claim 21, in which said restricting member is formed such that its sound transmitting property lowers from its center toward its end along the slice direction.

24. The adapter according to claim 21, further comprising means for holding said restricting member so that it can move away from and back toward said ultrasonic probe for the purpose of adjusting an angle of diffusion of ultrasonic waves in the slice direction.

25. The adapter according to claim 21, further comprising means for changing said aperture in the slice direction for the purpose of adjusting an angle of diffusion of ultrasonic waves in the slice direction.

26. An ultrasonic imaging apparatus comprising:
   an ultrasonic probe comprising piezoelectric transducers for electro-acoustic conversion;
   transmit excitation means for exciting said piezoelectric transducers to transmit ultrasonic waves;
   receiving means for receiving reflected waves from reflectors within a subject under examination through said piezoelectric transducers;
   control means for controlling said transmit excitation means and said receiving means to scan a two-dimensional scanning plane;
   detecting means for detecting Doppler components associated with a moving object and contained in a received signal by said receiving means as an image signal;
   displaying means for displaying a Doppler image using said image signal output from said detecting means; and
   a probe adapter for, when mounted on said ultrasonic probe, diffusing ultrasonic waves transmitted from said piezoelectric transducers and/or received from the reflectors within a subject in a slice direction perpendicular to the scanning plane.

27. The apparatus according to claim 26, in which said probe adapter is equipped with an acoustic lens for diffusing ultrasonic waves in the slice direction.

28. The apparatus according to claim 27, in which said acoustic lens consists of layers of a plurality of materials having different sound transmitting properties which are laminated in the direction in which ultrasonic waves are transmitted.

29. The apparatus according to claim 28, in which said materials include plastic and silicone rubber.

30. The apparatus according to claim 26, in which said probe adapter is provided with a restricting member for restricting the aperture in the slice direction of said ultrasonic probe.

31. The apparatus according to claim 30, in which said restricting member comprises a sound wave shielding member formed with a slit-like aperture in the slice direction.

32. The apparatus according to claim 30, in which said restricting member is formed such that its sound transmitting property lowers from its center toward its end along the slice direction.

* * * * *